United States Patent
Kim et al.

(10) Patent No.: US 11,682,925 B2
(45) Date of Patent: Jun. 20, 2023

(54) WIRELESS POWER TRANSMISSION APPARATUS FOR MINIMIZING MAGNETIC FIELD EXPOSURE BASED ON CAVITY RESONANCE

(71) Applicant: UNIVERSITY-INDUSTRY COOPERATION GROUP OF KYUNG HEE UNIVERSITY, Yongin-si (KR)

(72) Inventors: Sanghoek Kim, Suwon-si (KR); Sung Ik Park, Suwon-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 17/507,162

(22) Filed: Oct. 21, 2021

(65) Prior Publication Data

US 2022/0209580 A1 Jun. 30, 2022

(30) Foreign Application Priority Data

Dec. 28, 2020 (KR) .................. 10-2020-0184937

(51) Int. Cl.
*H02J 50/12* (2016.01)
*H02J 50/70* (2016.01)

(52) U.S. Cl.
CPC .............. *H02J 50/12* (2016.02); *H02J 50/70* (2016.02)

(58) Field of Classification Search
None
See application file for complete search history.

(56) References Cited

U.S. PATENT DOCUMENTS

| | | | | |
|---|---|---|---|---|
| 9,509,374 | B2* | 11/2016 | Kim | H02J 50/80 |
| 10,523,036 | B2* | 12/2019 | Pan | A61C 17/224 |
| 10,840,745 | B1* | 11/2020 | Maniktala | H02J 7/0077 |
| 2007/0103291 | A1* | 5/2007 | Adams | H01Q 1/2225 |
| | | | | 340/5.83 |
| 2011/0278945 | A1* | 11/2011 | Wheatley, III | H02J 50/12 |
| | | | | 307/104 |
| 2012/0025611 | A1* | 2/2012 | Kamata | H02J 7/00302 |
| | | | | 307/104 |

(Continued)

FOREIGN PATENT DOCUMENTS

| | | |
|---|---|---|
| JP | 4768670 B2 | 9/2011 |
| JP | 2017-220990 A | 12/2017 |

(Continued)

OTHER PUBLICATIONS

Geoffroy Lerosey, "Wireless power on the move", Nature, 2017, pp. 354-355, vol. 546.

*Primary Examiner* — Adi Amrany
(74) *Attorney, Agent, or Firm* — Sughrue Mion, PLLC (57) ABSTRACT

Disclosed in a wireless power transmission apparatus based on cavity-resonance including a transmission cavity leaking electromagnetic waves to a reception cavity through cavity-resonance with the reception cavity, and a nonlinear feedback circuit formed on a feedback path including the transmission cavity and configured to adaptively control an operating frequency in response to a change in a system resonance frequency according to the cavity-resonance.

9 Claims, 10 Drawing Sheets

(56) References Cited

U.S. PATENT DOCUMENTS

| | | | | |
|---|---|---|---|---|
| 2012/0280575 A1* | 11/2012 | Kim | .................. | H02J 50/80 |
| | | | | 307/104 |
| 2015/0171657 A1* | 6/2015 | Wheeland | ............... | H02J 50/12 |
| | | | | 307/104 |
| 2017/0093170 A1* | 3/2017 | Saunamaki | ............. | H02J 50/12 |
| 2018/0138747 A1* | 5/2018 | Mao | .................. | H02J 50/10 |
| 2019/0348850 A1* | 11/2019 | Sethi | .................. | G06F 1/28 |
| 2019/0356270 A1* | 11/2019 | Lee | .................. | H03F 1/0277 |
| 2019/0393731 A1* | 12/2019 | Maniktala | ............... | H02J 50/20 |
| 2021/0288620 A1* | 9/2021 | Lee | .................. | H03F 3/245 |

FOREIGN PATENT DOCUMENTS

| | | | | |
|---|---|---|---|---|
| KR | 10-2013-0020372 A | 2/2013 | | |
| KR | 10-1480754 B1 | 1/2015 | | |
| KR | 10-2020-0048081 A | 5/2020 | | |
| WO | WO-2015171213 A1 * | 11/2015 | ........... | A61B 5/0031 |

\* cited by examiner

WIRELESS POWER TRANSMISSION APPARATUS FOR MINIMIZING MAGNETIC FIELD EXPOSURE BASED ON CAVITY RESONANCE

This research was supported in part by the National Research Foundation of Korea (NRF) grant NRF2017R1C1B2009892, NRF-2018R1A6A1A03025708, and in part by the Ministry of Science and ICT (MSIT), South Korea, through the Information Technology Research Center (ITRC) support program supervised by the Institute for Information and Communications Technology Planning and Evaluation (IITP) under Grant IITP-2016-0-00291-0051001 and Grant IITP-2021-0-02046.

CROSS-REFERENCE TO RELATED APPLICATION

This application claims priority to and the benefit of Korean Patent Application No. 10-2020-0184937, filed on Dec. 28, 2020, the disclosure of which is incorporated herein by reference in its entirety.

BACKGROUND OF THE INVENTION

1. Field of the Invention

The present invention relates to a wireless power transmission apparatus and a method thereof, and more particularly, to technical idea for wirelessly transmitting and receiving power using a cavity between a transmission apparatus and a reception apparatus.

2. Description of the Related Art

Wireless power transmission technology for wirelessly transmitting electrical energy to a desired device, an electric motor or a transformer using an electromagnetic induction principle begins to be used in the 1800s, and since then, a method of radiating an electromagnetic wave such as a radio wave and a laser beam to transmit electrical energy has also been attempted.

In general, wireless power transmission technology may be divided into a magnetic induction method and a magnetic resonance method.

In detail, in the magnetic induction method, a primary coil is installed in a power transmission apparatus, and when electricity flows through the primary coil, a magnetic field is generated. A secondary coil is installed in a power reception apparatus. When the magnetic field generated in the primary coil flows in the secondary coil, power is transmitted by inducing electricity in the secondary coil according to the electromagnetic induction principle.

The magnetic induction method advantageously has high charging efficiency and complies with a standard method defined according to the Wireless Power Consortium (WPC) or the Power Matters Alliance (PMA).

In the magnetic resonance method, a primary coil is installed in the power transmission apparatus, and when electricity flows through an electric device installed in the power transmission apparatus, a natural frequency is generated in the primary coil, and in this case, when a natural frequency is transmitted to a power reception apparatus with a natural frequency that is the same as the natural frequency of the power transmission apparatus, a resonance phenomenon occurs in the secondary coil and power is transmitted.

The magnetic resonance method has an advantage in that charging is possible without direct contact and complies with a standard method defined according to alliance for wireless power (A4WP). Recently, the Airfuel Coalition combined by the A4WP and PMA has been founded to establish a new standard for increasing charging efficiency.

However, according to the aforementioned wireless power transmission technology, a magnetic field is continuously exposed in a transmission apparatus, and when approaching the transmission apparatus, a part of the human body is continuously exposed to the magnetic field.

CITED REFERENCE

Patent Document

Korean Patent Publication No. 2020-0048081, "Power Transmission System and Method using Wave Guide"

SUMMARY OF THE INVENTION

Therefore, the present invention has been made in view of the above problems, and it is an object of the present invention to provide a wireless power transmission apparatus for minimizing an electromagnetic field exposed during wireless power transmission through cavity resonance.

It is another object of the present invention to provide a wireless power transmission apparatus for minimizing an electromagnetic field exposed without reduction in power transmission efficiency.

It is yet another object of the present invention to provide a wireless power transmission apparatus in which an operating frequency is adaptively changed to an optimum transmission frequency depending on relative positions between transmission and reception cavities.

In accordance with an aspect of the present invention, the above and other objects can be accomplished by the provision of a wireless power transmission apparatus comprising: a transmission cavity leaking electromagnetic waves to a reception cavity through cavity-resonance with the reception cavity; and a nonlinear feedback circuit formed on a feedback path including the transmission cavity and configured to adaptively control an operating frequency in response to a change in a system resonance frequency according to the cavity-resonance.

In accordance with an aspect, at least one of the transmission cavity or the reception cavity may include a body part having a cavity formed therein, and a mesh part formed of a conductor on the body part.

In accordance with an aspect, the mesh part may be formed to have a honeycomb structure and may leak electromagnetic waves through the honeycomb structure to achieve energy coupling between the transmission cavity and the reception cavity.

In accordance with an aspect, the reception cavity may include a material having a relative dielectric constant equal to or greater than a preset size in the body part and may be formed with a smaller size than the transmission cavity.

In accordance with an aspect, the reception cavity may be formed with a size equal to or less than $\frac{1}{3}$ of a size of the transmission cavity.

In accordance with an aspect, the nonlinear feedback circuit may control a system to resonate at an operating frequency corresponding to the system resonance frequency that is changed based on at least one of a distance between the transmission cavity and the reception cavity or a relative position of the reception cavity with respect to the transmission cavity.

In accordance with an aspect, the nonlinear feedback circuit may further include a power amplifier connected to an input node of the transmission cavity and configured to output an input signal having the operating frequency controlled in response to a change in the system resonance frequency to the input node of the transmission cavity.

In accordance with an aspect, the nonlinear feedback circuit may further include a phase shifter disposed between an output node of the transmission cavity and an input node of the amplifier and configured to control a phase of an output signal received from the output node of the transmission cavity to make a system oscillate at the operating frequency.

In accordance with an aspect, the nonlinear feedback circuit may further include a power detector configured to monitor amplitude of a resonance signal and to output a monitoring result to the phase shifter.

In accordance with an aspect, the nonlinear feedback circuit may further include a low pass filter (LPF) disposed between an output node of the amplifier and the input node of the transmission cavity and configured to filter a harmonic signal such that the system does not resonate at undesirable harmonic frequencies.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the scope of rights according to the concept of the present invention.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" in the specification should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure will now be described more fully with reference to the accompanying drawings, in which exemplary embodiments of the invention are shown. This disclosure may, however, be embodied in many different forms and should not be construed as limited to the exemplary embodiments set forth herein. Like reference numerals in the drawings denote like elements.

Figure 1:
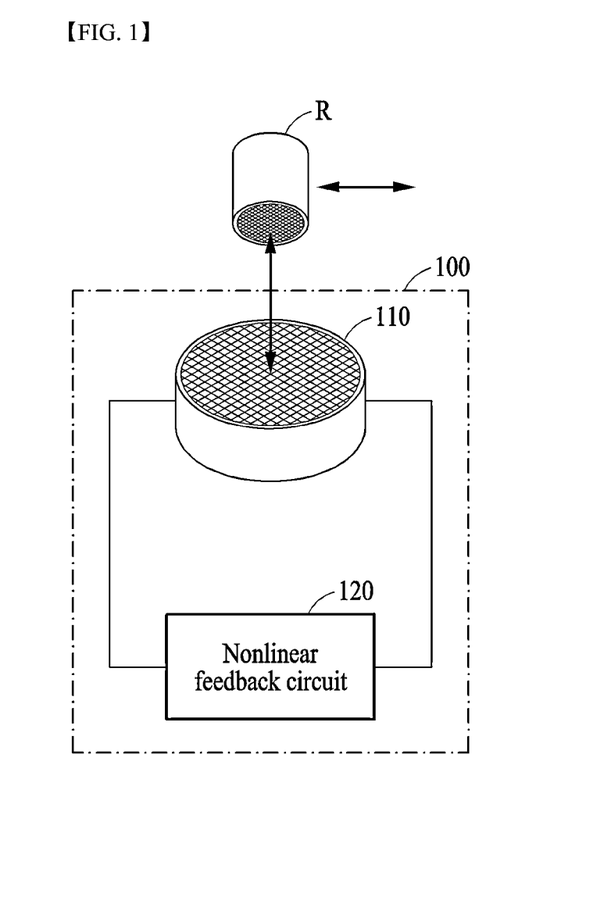
FIG. 1 is a diagram for explaining a wireless power transmission apparatus according to an embodiment.

FIG. 1 is a diagram for explaining a wireless power transmission apparatus according to an embodiment.

Referring to FIG. 1, a wireless power transmission apparatus 100 according to an embodiment may minimize an electromagnetic field that is exposed during wireless power transmission through cavity-resonance.

The wireless power transmission apparatus 100 may minimize the exposed electromagnetic field without reduction in power transmission efficiency.

The wireless power transmission apparatus 100 may adaptively change an operating frequency to an optimum transmission frequency depending on relative positions between transmission and reception cavities.

To this end, the wireless power transmission apparatus 100 may include a transmission cavity (i.e., a transmission resonator) 110 and a nonlinear feedback circuit 120.

The transmission cavity 110 according to an embodiment may leak electromagnetic waves to a reception cavity R through cavity-resonance with the reception cavity R. For example, the reception cavity R may be included in a wireless power reception apparatus.

According to an aspect, at least one of the transmission cavity 110 or the reception cavity R may include a body part having a cavity formed therein and a mesh part formed of a conductor on the body part.

For example, the mesh part may be formed in a honeycomb structure, and as such, energy coupling between transmission and reception cavities may be achieved by a small amount of leaking electromagnetic wave.

In detail, the transmission cavity 110 and the reception cavity R may be coupled to each other using a very small energy coupling factor through evanescent waves leaking from the mesh part formed in the cavity, thereby minimizing exposure of an electromagnetic field.

The transmission cavity 110 and the reception cavity R based on cavity-resonance may have a very high quality-factor compared with a conventional coil resonator, and thus even if an energy coupling factor between the transmission apparatus and the reception apparatus is low, the same power transmission efficiency as that of a conventional system may be achieved.

In more detail, in a wireless power transmission system, the power transmission efficiency may be determined by multiplying the energy coupling factor by the Q-factor, and even if the energy coupling factor is low, when the system has a high Q-factor, high power transmission efficiency may be achieved.

A conventional wireless power transmission apparatus using a coil may have a high energy coupling factor (i.e., exposure of a strong electromagnetic field), but may have a low Q-factor, and here, when the energy coupling factor is lowered to reduce exposure of an electromagnetic field, the power transmission efficiency may be reduced.

In contrast, the wireless power transmission apparatus 100 according to an embodiment may wirelessly transmit and receive power through an EMI shielding honeycomb structure, that is, the mesh part included in the transmission cavity 110 and the reception cavity R, and thus may have a very low energy coupling factor but may have a high Q-factor, and accordingly, high power transmission efficiency may be maintained.

According to an aspect, the reception cavity R may have the same size as the transmission cavity 110. The reception cavity R may include a material having a relative dielectric constant equal to or greater than a preset size in the body part and may have a smaller size than the transmission cavity 110.

For example, the reception cavity R may have a size equal to or less than ⅓ of the size of the transmission cavity 110. For example, the transmission cavity 110 may be formed as a cylindrical structure having a diameter of 210 mm, and the reception cavity R may be formed as a cylindrical structure having a diameter of 52.8 mm.

In detail, even if the reception cavity R and the transmission cavity 110 have different sizes, when a material having a high relative dielectric constant is filled in a small cavity, the two cavities may resonate in the same mode at the same frequency.

The transmission cavity 110 may have a spacer formed on the mesh part, and when the spacer formed on the mesh part 112 and the reception cavity R are positioned within a predetermined distance, electromagnetic waves may leak. For example, the spacer may be formed of a common floor material or a wood material.

For example, the wireless power transmission apparatus 100 may be installed over an entire lower part of the floor in a place in which electricity needs to be supplied, such as a public place, a cafe, an office, and a government office, and a wireless power reception apparatus including the reception cavity R may be installed in a table, a chair, or the like included in a spacer installed on the floor, but the present invention is not limited thereto, and may also be applied to a system for wireless charging of a vehicle or an electronic device.

The nonlinear feedback circuit 120 according to an embodiment may be formed on a feedback path including the transmission cavity 110 and may adaptively control an operating frequency in response to a change in a system resonance frequency based on cavity-resonance. Here, the system resonance frequency may refer to a resonance frequency due to coupling between the wireless power transmission apparatus 100 and the wireless power reception apparatus.

According to an aspect, the nonlinear feedback circuit 120 may control the operating frequency in response to the system resonance frequency that is changed based on at least one of a distance between the transmission cavity 110 and the reception cavity R or a relative position of the reception cavity R with respect to the transmission cavity 110.

To this end, the nonlinear feedback circuit 120 may include a power amplifier connected to an input node of the transmission cavity 110 and configured to output an input signal having an operating frequency controlled in response to a change in the system resonance frequency to the input node of the transmission cavity 110, and a phase shifter configured between an output node of the transmission cavity 110 and an input node of the power amplifier and configured to control a phase of an output signal received from the output node of the transmission cavity 110 such that the amplitude of a resonance signal in a nonlinear feedback circuit is equal to or greater than a preset amplitude.

The nonlinear feedback circuit 120 may include a power detector for monitoring the amplitude of the resonance signal and outputting the monitoring result to the phase shifter.

In detail, when the nonlinear feedback circuit 120 is operated using the power amplifier, a phase needs to maximize resonance amplitude, which may be performed by the phase shifter. That is, the phase shifter may detect the resonance amplitude in the nonlinear feedback circuit 120 through the power detector and may periodically change the phase to maximize the amplitude.

The nonlinear feedback circuit 120 may further include a low pass filter (LPF) disposed between the output node of the power amplifier and the input node of the transmission cavity and configured to filter (remove) harmonic signals included in the input signal output to the input node of the transmission cavity.

In detail, a transmission apparatus and a reception apparatus configuring a conventional wireless power transmission system may configure a pair of resonators having similar resonance frequencies, the system resonance frequency may be different from a resonance frequency of each of a transmitter and a receiver depending on a distance between the two resonators, and power needs to be supplied to the transmitter at the system resonance frequency in order to have maximum power transmission efficiency.

That is, in the conventional wireless power transmission system, when a distance between the transmission apparatus and the reception apparatus is changed without a change in the operating frequency, efficiency may be abruptly lowered, and thus, to overcome this, the system resonance frequency may be fixed to a constant operating frequency by changing the resonance frequency of the transmission apparatus and the reception apparatus, but in general, this process has a problem in that it is complicated to implement the process because communication and optimization processes between a transmitter and a receiver that require information on the amount of power received through the reception apparatus needs to be performed.

To overcome this, the wireless power transmission apparatus 100 according to an embodiment may use the nonlinear feedback circuit 120 included in the power amplifier.

In more detail, in the nonlinear feedback circuit 120, when an open-loop gain of the power amplifier is greater than '1', the feedback circuit may have characteristics of divergence with the resonance frequency of the system, but here, the power amplifier may have nonlinear characteristics, and thus the resonance amplitude in the system may oscillate with a constant amplitude without divergence.

In this case, an oscillation frequency (i.e., operating frequency) in the nonlinear feedback circuit 120 corresponds to the system resonance frequency, and thus the transmitter may resonate at the system resonance frequency, which changes depending on the position and relative distance of the reception cavity, and may wirelessly transmit power with maximum efficiency.

In other words, the wireless power transmission apparatus 100 according to an embodiment may maintain the maximum power transmission efficiency using a method of automatically tuning the operating frequency to the changing system resonance frequency rather than fixing the system resonance frequency to a constant operating frequency like the conventional wireless power transmission apparatus.

Figure 2:
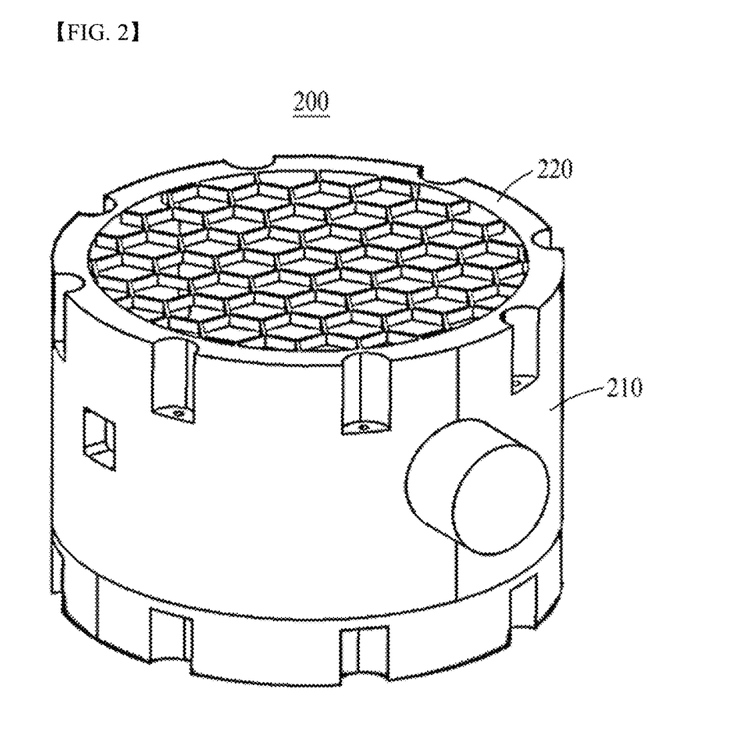
FIG. 2 is a diagram for explaining a cavity according to an embodiment.

FIG. 2 is a diagram for explaining a cavity according to an embodiment.

A cavity 200 according to an embodiment may be a reception cavity included in a wireless power reception apparatus as well as a transmission cavity included in a wireless power transmission apparatus according to an embodiment, but hereinafter, the cavity 200 will be exemplified as the transmission cavity.

Referring to FIG. 2, the cavity 200 according to an embodiment may have a cavity formed therein and may include a body part 210 in which electromagnetic waves are generated through resonance on the formed cavity, and a mesh part 220 formed of a conductor on the body part.

For example, holes corresponding to input and output nodes connected to one line may be formed in the body part 210.

In detail, the input node of the body part 210 may be connected to an output node of a low pass filter (LPF) included in the nonlinear feedback circuit, and the output node of the body part 210 may be connected to an input node of a phase shifter included in the nonlinear feedback circuit.

According to an aspect, the body part 210 may be connected to an external source device through one line and may generate electromagnetic waves.

In detail, the input node of the body part 210 may receive an input signal input through a line via the power amplifier and the low pass filter (LPF) of the nonlinear feedback circuit, and the body part 210 may generate electromagnetic waves through resonance on the cavity based on the received input signal.

According to an aspect, the mesh part 220 may be formed to have a honeycomb structure, and thereby, only a small amount of electromagnetic waves may leak.

In detail, the mesh part 220 may be formed of a conductor in the form of a mesh having a plurality of square holes formed therein above the body part 210. For example, the body part 210 may use copper as the conductor but is not limited thereto, and various conductors may be applied.

In other words, the mesh part 220 may be disposed on the body part 210 and may guide the electromagnetic waves generated through resonance on the cavity to be transmitted to the reception cavity.

That is, the cavity 200 according to an embodiment may be coupled using a very small energy coupling factor through evanescent waves leaking from the formed on an upper part, thereby minimizing exposure of an electromagnetic field.

The cavity 200 based on cavity-resonance has a very high quality factor (Q-factor) compared with a conventional coil resonator, and thus even if an energy coupling factor between the transmission apparatus and the reception apparatus is low, the same power transmission efficiency as that of a conventional system may be achieved.

Figure 3:
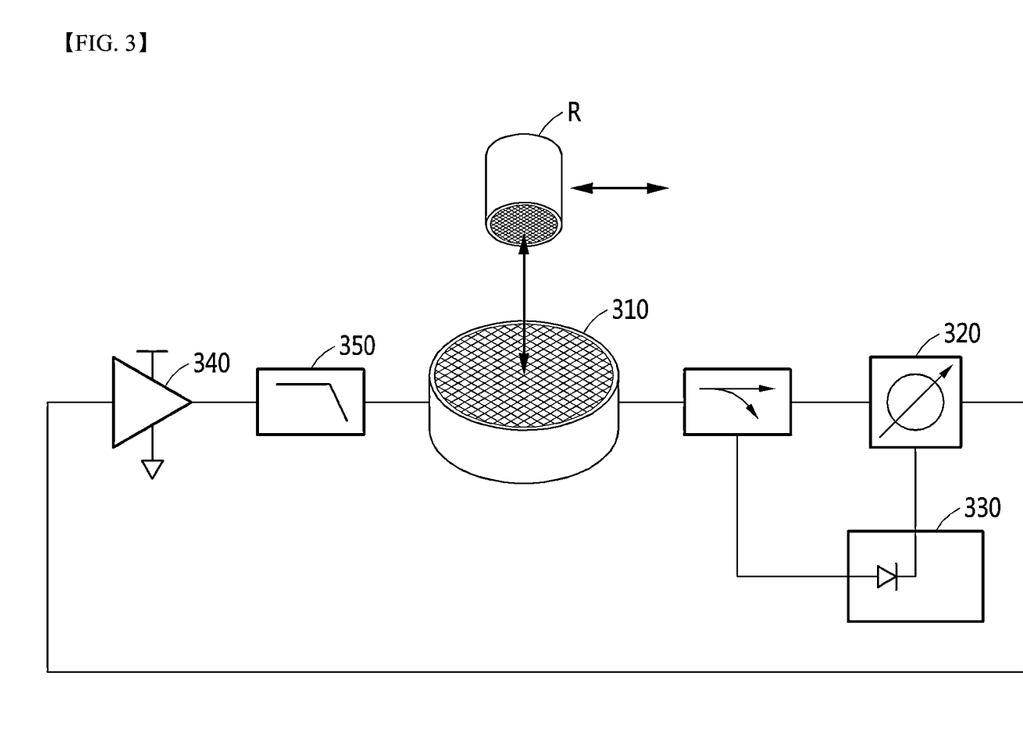
FIG. 3 is a diagram for explaining a wireless power transmission apparatus according to an embodiment.
Figure 4A:
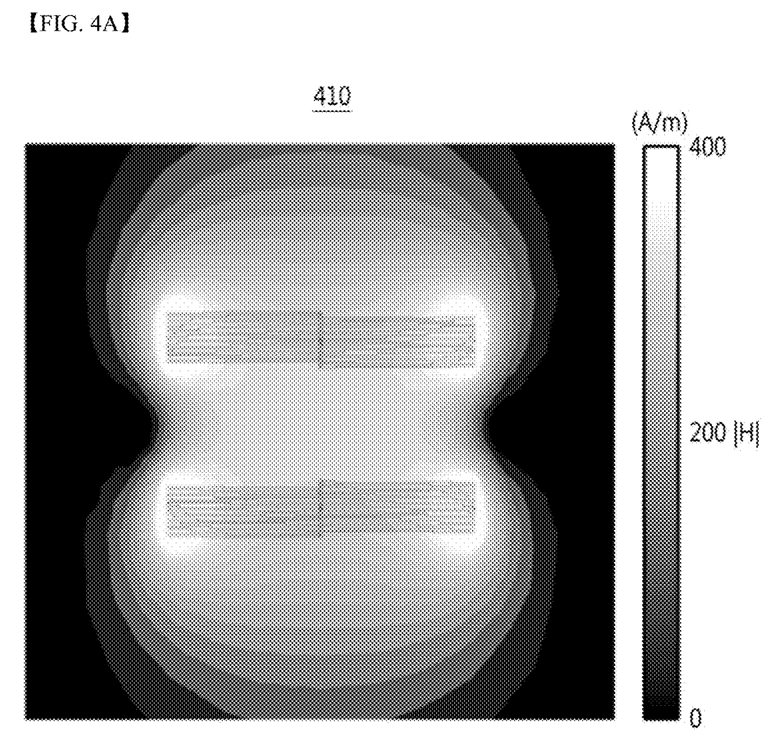
FIGS. 4A to 4D are diagrams for explaining a measurement experiment result of an electromagnetic field using a wireless power transmission apparatus according to an embodiment.
Figure 4B:
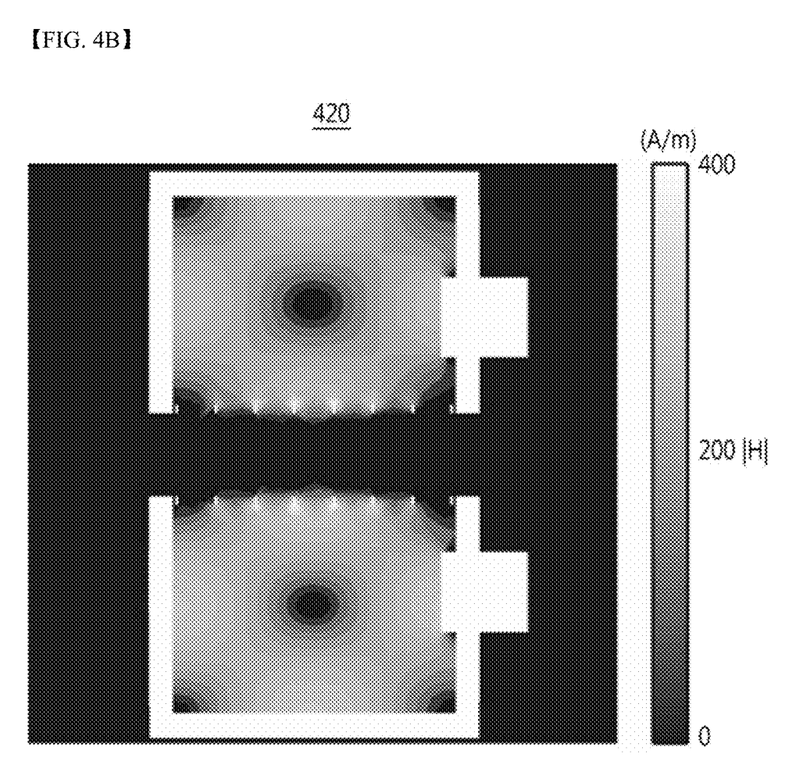
Figure 4C:
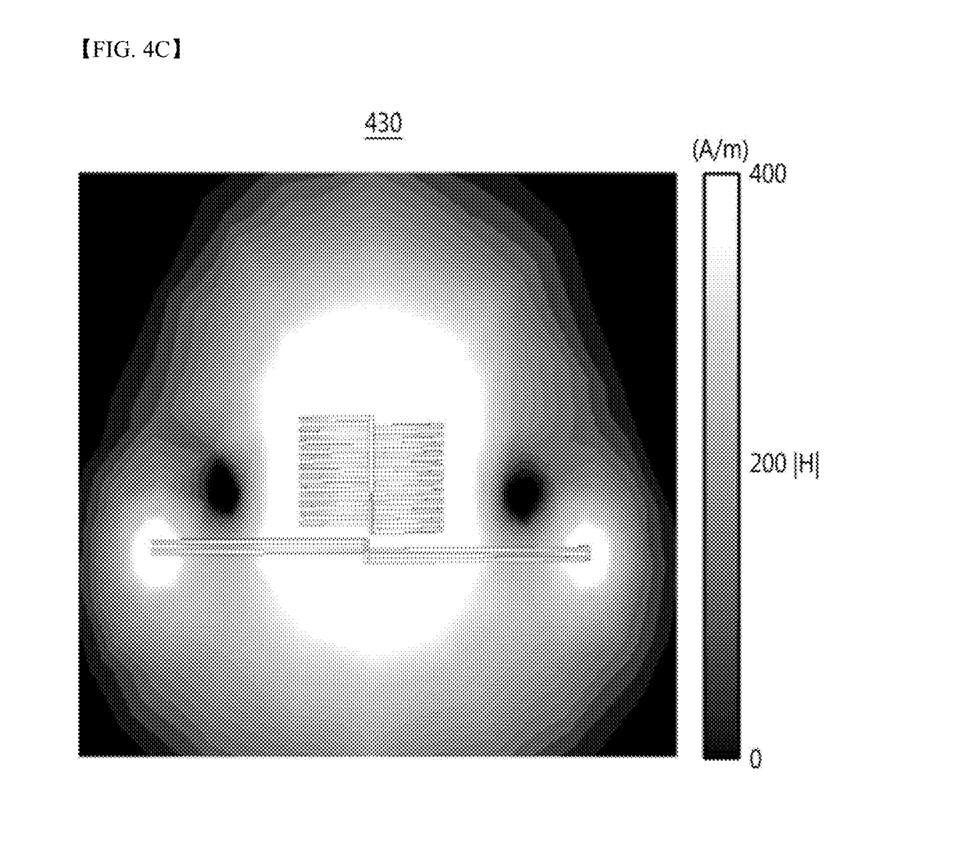
Figure 4D:
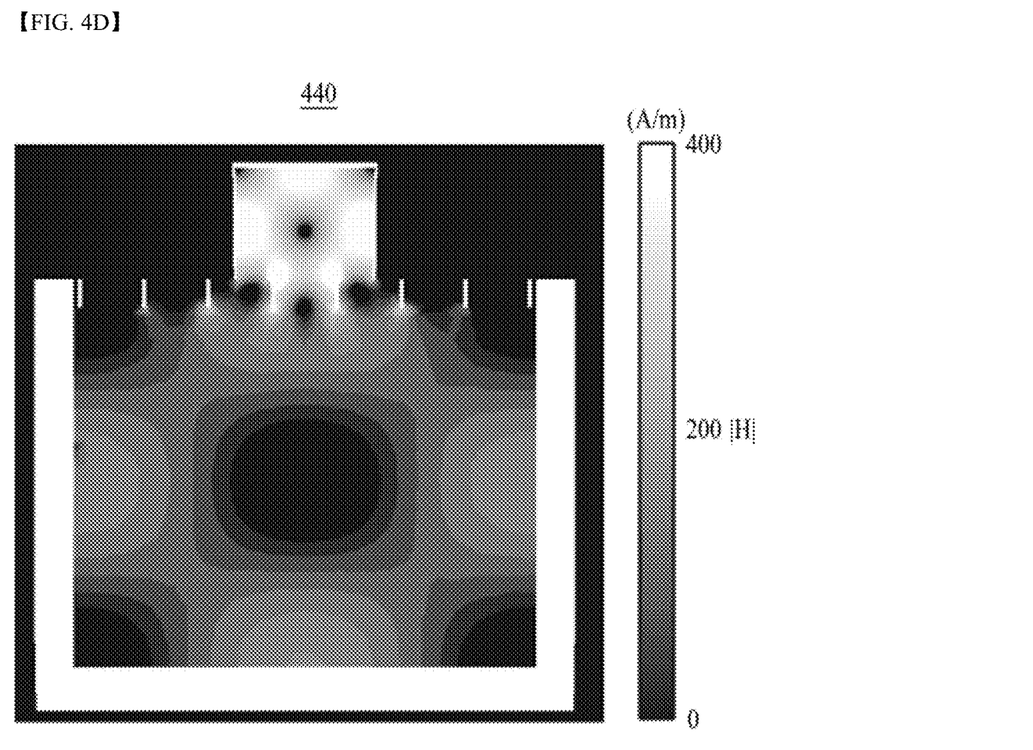

FIG. 3 is a diagram for explaining a wireless power transmission apparatus according to an embodiment.

Referring to FIG. 3, the wireless power transmission apparatus according to an embodiment may include a transmission cavity 310 and a nonlinear feedback circuit.

The transmission cavity 310 according to an embodiment may leak electromagnetic waves to the reception cavity R through cavity-resonance with the reception cavity R.

According to an aspect, at least one of the transmission cavity 310 or the reception cavity R may include a body part having a cavity formed therein and a mesh part formed of a conductor on the body part.

In detail, the transmission cavity 310 and the reception cavity R may be coupled using a very small energy coupling factor through evanescent waves that leak from the mesh part formed on the cavity, and thereby exposure of the electromagnetic field may be minimized.

The transmission cavity 310 and the reception cavity R based on cavity-resonance may have a very high Q-factor compared with a conventional coil resonator, and thus even if an energy coupling factor between the transmission apparatus and the reception apparatus is low, the same power transmission efficiency as that of a conventional system may be achieved.

In more detail, a conventional wireless power transmission apparatus using a coil may have a high energy coupling factor (i.e., exposure of a strong electromagnetic field), but may have a low Q-factor, and here, when the energy coupling factor is lowered to reduce exposure of an electromagnetic field, power transmission efficiency may be reduced.

In contrast, the wireless power transmission apparatus according to an embodiment may wirelessly transmit and receive power through an EMI shielding honeycomb structure, that is, the mesh part included in the transmission cavity 310 and the reception cavity R, and thus may have a very low energy coupling factor but may have a high Q-factor, and accordingly, high power transmission efficiency may be maintained.

The nonlinear feedback circuit according to an embodiment may be formed on a feedback path including the transmission cavity 310 and may adaptively control an operating frequency in response to a change in a system resonance frequency based on cavity-resonance.

According to an aspect, the nonlinear feedback circuit may control the system to resonate at an operating frequency corresponding to the system resonance frequency that is changed based on at least one of a distance between the transmission cavity 310 and the reception cavity R or a relative position of the reception cavity R with respect to the transmission cavity 310.

To this end, the nonlinear feedback circuit may include a phase shifter 320, a power detector 330, a power amplifier 340, and a low pass filter (LPF) 350.

The phase shifter 320 may be disposed between the output node of the transmission cavity 110 and the input node of the power amplifier 340, and may control a phase of an output signal received from the output node of the transmission cavity 110 to make the system oscillate at the operating frequency.

The power detector 330 may monitor the amplitude of the resonance signal and may output the monitoring result to the phase shifter.

The power amplifier 340 may output an input signal having an operating frequency controlled in response to a change in the system resonance frequency to an input node of the low pass filter (LPF) 350.

The low pass filter (LPF) 350 may be disposed between the output node of the power amplifier 340 and the input node of the transmission cavity 310 and may remove a noise signal contained in the input signal output to the input node of the transmission cavity 310.

The nonlinear feedback circuit according to an embodiment may further include an oscillator for generating a power signal at a predetermined frequency and transferring the generated power signal to the power amplifier 340 to generate an input signal.

In detail, in the nonlinear feedback circuit, when an open-loop gain of the power amplifier 340 is greater than '1', the feedback circuit may have characteristics of divergence with the resonance frequency of the system, but here, the power amplifier 340 may have nonlinear characteristics, and thus the resonance amplitude in the system may oscillate with a constant amplitude without divergence.

In this case, an oscillation frequency (i.e., operating frequency) in the nonlinear feedback circuit corresponds to the system resonance frequency, and thus the wireless power transmission apparatus may resonate at the system resonance frequency, which changes depending on the position and relative distance of the reception cavity, and may wirelessly transmit power with the maximum efficiency.

FIGS. 4A to 4D are diagrams for explaining a measurement experiment result of an electromagnetic field using a wireless power transmission apparatus according to an embodiment.

Referring to FIGS. 4A to 4D, reference numeral 410 denotes an electromagnetic field that is measured during resonance using a transmission coil and a reception coil, which have the same size, and reference numeral 420 denotes an electromagnetic field that is measured during cavity-resonance using a transmission cavity and a reception cavity, which have the same size.

Reference numeral 430 denotes an electromagnetic field that is measured during resonance using a transmission coil and a reception coil having a smaller size than the transmission coil, and reference numeral 440 denotes an electromagnetic field that is measured during cavity-resonance using a transmission cavity and a reception cavity having a smaller size than the transmission cavity.

As shown in reference numerals 410 to 440, conventional wireless power transmission apparatuses (reference numerals 410 and 430), the electromagnetic fields exposed to the outside of which are at least 10 to 100 times higher than in the case in which the wireless power transmission apparatus (reference numerals 420 and 430) according to an embodiment is used.

It may be seen that, when the wireless power transmission apparatuses (reference numerals 420 and 440) according to an embodiment are used, the reception cavity may be positioned on the transmission cavity including a mesh part and may cause a TE111 mode in which resonance occurs at 1.527 GHz and strong magnetic resonance is shielded inside the cavity.

In detail, in the wireless power transmission apparatus according to an embodiment, the transmission cavity and the reception cavity may be coupled using a very small energy coupling factor through evanescent waves that leak from the mesh part formed on the cavity, thereby minimizing exposure of the electromagnetic field.

The wireless power transmission apparatus according to an embodiment may wirelessly transmit and receive power through the mesh part included in the transmission cavity and the reception cavity, and thus may have a very low energy coupling factor but may have a high Q-factor, and accordingly, high power transmission efficiency may be maintained.

Figure 5A:
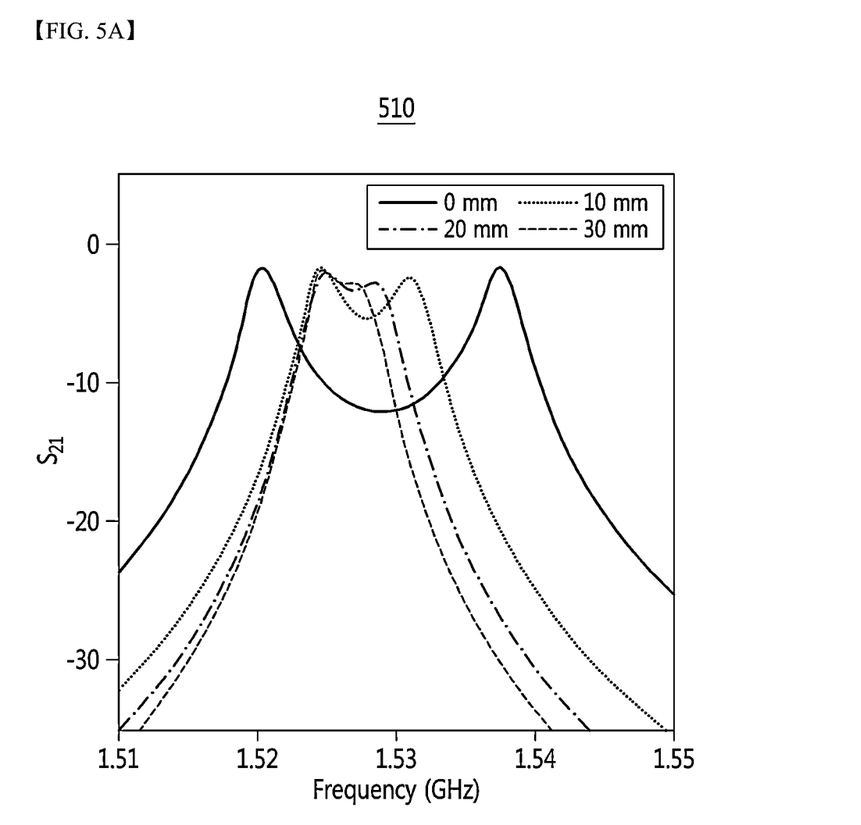
FIGS. 5A to 5C are diagrams for explaining frequency splitting of a wireless power transmission apparatus according to an embodiment.
Figure 5B:
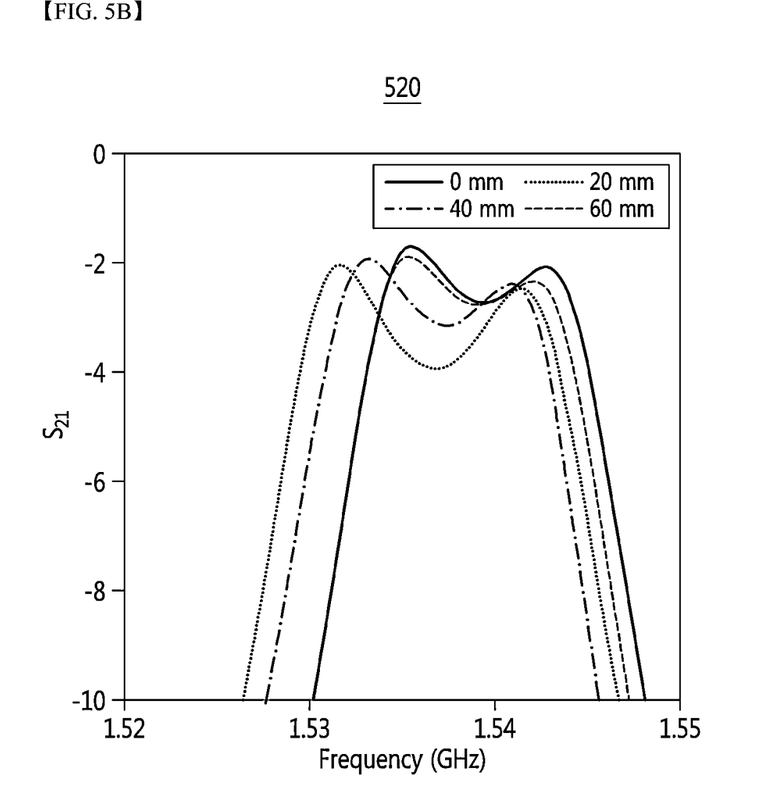
Figure 5C:
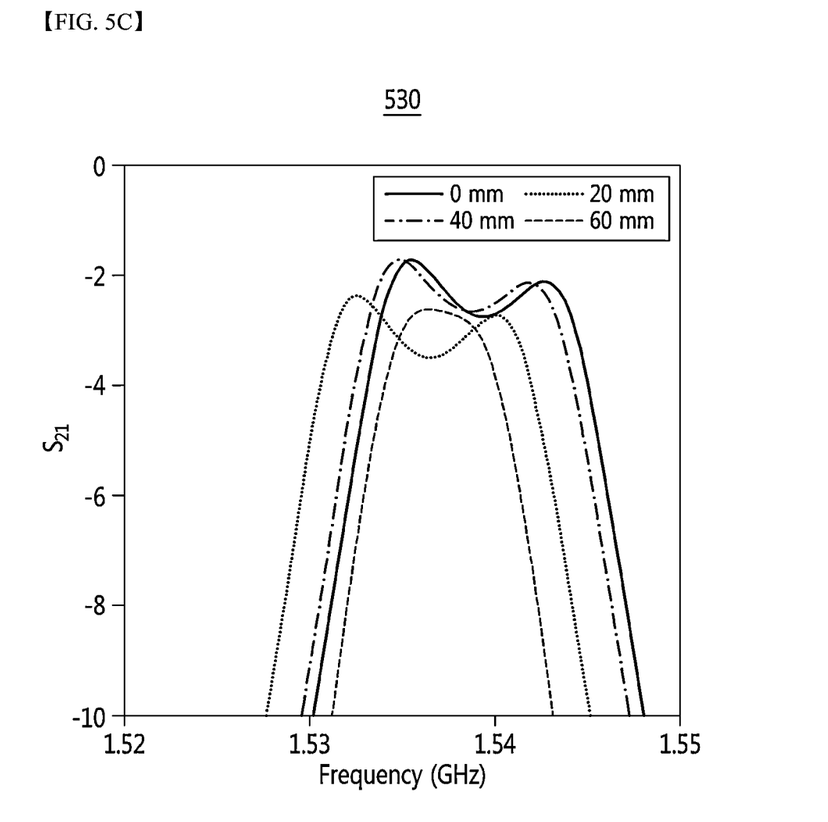

FIGS. 5A to 5C are diagrams for explaining frequency splitting of a wireless power transmission apparatus according to an embodiment.

Referring to FIGS. 5A to 5C, reference numerals 510 to 530 show frequency splitting depending on a change in a relative position of transmission and reception cavities included in a wireless power transmission apparatus and a wireless power reception apparatus according to an embodiment.

In detail, reference numeral 510 denotes frequency splitting depending on position change (0 mm, 10 mm, 20 mm, and 30 mm from the center) of the cavity in the z-axis direction, reference numeral 520 denotes frequency splitting depending on position change (0 mm, 20 mm, 40 mm, and 60 mm from the center) of the cavity in the x-axis direction, and reference numeral 530 denotes frequency splitting depending on a position change (0 mm, 20 mm, 40 mm, and 60 mm from the center) of the cavity in the y-axis direction.

In other words, reference numeral 510 shows characteristics depending on a change in a distance between the transmission cavity and the reception cavity, and reference numerals 520 and 530 show the characteristics depending on a change in a relative position of the reception cavity with respect to the transmission cavity.

As seen from reference numerals 510 to 530, when the wireless power transmission apparatus according to an embodiment is positioned adjacent to a wireless power reception apparatus, magnetic coupling may be formed between transmission and reception cavities, splitting of a resonance frequency may occur.

It may be seen that the wireless power transmission apparatus according to an embodiment provides constant power transmission efficiency irrespective of a relative distance and position of transmission and reception cavities through adaptive control of an operating frequency using a nonlinear feedback circuit.

In detail, when an open-loop gain of the power amplifier is greater than '1', the feedback circuit may have characteristics of divergence with the resonance frequency of the system, but here, the power amplifier may have nonlinear characteristics, and thus the resonance amplitude in the system may oscillate with a constant amplitude without divergence In this case, an oscillation frequency in the nonlinear feedback circuit in the nonlinear feedback circuit corresponds to the system resonance frequency, and thus the transmitter may resonate at the system resonance frequency, which changes depending on the position and relative distance of the reception cavity, and may wirelessly transmit power with the maximum efficiency.

As a result, according to the present invention, an electromagnetic field exposed during wireless power transmission through cavity-resonance may be minimized.

According to the present invention, an exposed electromagnetic field may be minimized without degradation in power transmission efficiency.

According to the present invention, an operating frequency may be adaptively changed to an optimum transmission frequency depending on relative positions between transmission and reception cavities.

According to an embodiment, the present invention may minimize an electromagnetic field exposed during wireless power transmission through cavity-resonance.

According to an embodiment, the present invention may minimize an electromagnetic field exposed without reduction in power transmission efficiency.

According to an embodiment, the present invention may adaptively change an operating frequency to an optimum transmission frequency depending on relative positions between transmission and reception cavities.

Although the present disclosure has been described with reference to limited embodiments and drawings, it should be understood by those skilled in the art that various changes and modifications may be made therein. For example, the described techniques may be performed in a different order than the described methods, and/or components of the described apparatuses, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

DESCRIPTION OF REFERENCE NUMERALS

| | |
|---|---|
| 100: wireless power transmission apparatus | 110: transmission cavity |
| 120: nonlinear feedback circuit | R: reception cavity |

What is claimed is:

1. A wireless power transmission system including a wireless power transmission apparatus and a wireless power receiver,
wherein the wireless power receiver comprises a reception cavity, and
wherein the wireless power transmission apparatus comprises:
  a transmission cavity leaking electromagnetic waves to the reception cavity of the wireless power receiver through cavity-resonance with the reception cavity; and
  a nonlinear feedback circuit formed on a feedback path including the transmission cavity and configured to adaptively control an operating frequency in response to a change in a system resonance frequency according to the cavity-resonance,
wherein each of the transmission cavity and the reception cavity includes a body part having a cavity formed therein, and a mesh part formed of a conductor on the body part.

2. The wireless power transmission system according to claim 1, wherein the mesh part is formed to have a honeycomb structure and leaks electromagnetic waves through the honeycomb structure to achieve energy coupling between the transmission cavity and the reception cavity.

3. The wireless power transmission system according to claim 1, wherein the reception cavity includes a material having a relative dielectric constant equal to or greater than a preset size in the body part and is formed with a smaller size than the transmission cavity.

4. The wireless power transmission system according to claim 3, wherein the reception cavity is formed with a size equal to or less than ⅓ of a size of the transmission cavity.

5. The wireless power transmission system according to claim 1, wherein the nonlinear feedback circuit controls a system to resonate at an operating frequency corresponding to the system resonance frequency that is changed based on at least one of a distance between the transmission cavity and the reception cavity or a relative position of the reception cavity with respect to the transmission cavity.

6. The wireless power transmission system according to claim 1, wherein the nonlinear feedback circuit includes a power amplifier connected to an input node of the transmission cavity and configured to output an input signal having the operating frequency controlled in response to a change in the system resonance frequency to the input node of the transmission cavity.

7. The wireless power transmission system according to claim 6, wherein the nonlinear feedback circuit further includes a phase shifter disposed between an output node of the transmission cavity and an input node of the amplifier and configured to control a phase of an output signal received from the output node of the transmission cavity to make a system oscillate at the operating frequency.

8. The wireless power transmission system according to claim 7, wherein the nonlinear feedback circuit further includes a power detector configured to monitor amplitude of a resonance signal and to output a monitoring result to the phase shifter.

9. The wireless power transmission system according to claim 6, wherein the nonlinear feedback circuit further includes a low pass filter (LPF) disposed between an output node of the amplifier and the input node of the transmission cavity and configured to filter a harmonic signal output from the transmission cavity.

\* \* \* \* \*